(12) United States Patent
Reyes et al.

(10) Patent No.: US 9,917,657 B1
(45) Date of Patent: Mar. 13, 2018

(54) VERIFICATION OF AIRCRAFT EMITTER

(71) Applicant: Rockwell Collins, Inc., Cedar Rapids, IA (US)

(72) Inventors: Gina M. Reyes, Iowa City, IA (US); Raymond A. Kamin, III, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 37 days.

(21) Appl. No.: 14/303,095

(22) Filed: Jun. 12, 2014

(51) Int. Cl.
*H04B 17/00* (2015.01)

(52) U.S. Cl.
CPC .................... *H04B 17/00* (2013.01)

(58) Field of Classification Search
None
See application file for complete search history.

(56) References Cited

U.S. PATENT DOCUMENTS

| | | | | |
|---|---|---|---|---|
| 4,746,924 A * | 5/1988 | Lightfoot | .................. | G01S 5/02 342/159 |
| 5,039,991 A * | 8/1991 | Boese | ..................... | G01S 3/043 342/169 |
| 7,119,739 B1 * | 10/2006 | Struckman | ............. | G01R 29/10 342/174 |
| 7,464,005 B1 * | 12/2008 | Beetner | ................... | G01S 7/021 342/463 |
| 7,576,695 B2 * | 8/2009 | Smith | .................... | G01H 17/00 342/457 |
| 7,809,405 B1 * | 10/2010 | Rand | ..................... | G08G 5/0013 455/431 |
| 8,326,240 B1 | 12/2012 | Kadambe et al. | | |
| 8,494,464 B1 * | 7/2013 | Kadambe | ................. | H04K 3/45 342/14 |
| 8,699,971 B1 | 4/2014 | Kadambe et al. | | |
| 8,904,522 B1 * | 12/2014 | Kambhampati | ...... | H04W 4/006 726/22 |
| 2005/0052315 A1 * | 3/2005 | Winterling | ............... | G01S 5/04 342/126 |
| 2006/0119515 A1 * | 6/2006 | Smith | ......................... | 342/450 |
| 2007/0200761 A1 * | 8/2007 | Smith | ..................... | G01S 13/86 342/454 |
| 2008/0266166 A1 * | 10/2008 | Schuchman | ........... | G07C 5/008 342/37 |
| 2010/0008450 A1 * | 1/2010 | Ray | ..................... | H04L 27/0012 375/340 |
| 2010/0015910 A1 * | 1/2010 | Hensley | ................. | H04K 3/226 455/1 |
| 2010/0039233 A1 * | 2/2010 | Niedzwiecki | ............ | H04Q 9/00 340/10.1 |
| 2011/0267222 A1 * | 11/2011 | Craig | ........................ | 342/25 B |
| 2012/0041620 A1 * | 2/2012 | Stayton | ................ | G08G 5/0008 701/3 |
| 2012/0092211 A1 * | 4/2012 | Hampel | .................... | G01S 3/74 342/175 |

(Continued)

*Primary Examiner* — Zhiyu Lu
(74) *Attorney, Agent, or Firm* — Angel N. Gerdzhikov; Donna P. Suchy; Daniel M. Barbieri (57) ABSTRACT

A method and system. The method includes receiving at least one signal and measuring at least one physical layer feature of the at least one signal. The method further includes determining that the at least one signal originated from an emitter of an aircraft based on the at least one measured physical layer feature of the at least one signal.

15 Claims, 4 Drawing Sheets

(56) References Cited

U.S. PATENT DOCUMENTS

| | | | |
|---|---|---|---|
| 2012/0121087 A1* | 5/2012 | Psiaki | G01S 19/215 380/255 |
| 2012/0182161 A1* | 7/2012 | Rutherford | G08G 5/0008 340/945 |
| 2013/0303232 A1* | 11/2013 | Thomas | H04W 52/146 455/550.1 |
| 2014/0198684 A1* | 7/2014 | Gravely | H04L 43/18 370/254 |
| 2014/0274177 A1* | 9/2014 | Carbajal | H04W 24/08 455/501 |
| 2014/0327564 A1* | 11/2014 | Sampigethaya | H04L 9/3215 342/32 |
| 2014/0327581 A1* | 11/2014 | Murphy | G01S 3/043 342/417 |
| 2014/0357267 A1* | 12/2014 | Carranza | H04W 48/16 455/434 |
| 2015/0331099 A1* | 11/2015 | Wu | G01S 13/876 342/32 |

\* cited by examiner

VERIFICATION OF AIRCRAFT EMITTER

FIELD OF THE INVENTION

Embodiments of the invention are directed generally toward a method, apparatus, and system for identifying the generating emitter of radiofrequency signals.

BACKGROUND

Currently, there is no direct association between commercial aircraft voice communication channels and the location information presented to air traffic controllers or other pilots. This is currently done by air traffic controllers and pilots stating the aircraft flight ID (call sign) during exchanges of information; however, there is currently no positive identification of the aircraft on an air traffic controller's display(s) (or pilot display(s)) while the communication is taking place in real time.

An additional problem with existing automatic dependent surveillance-broadcast (ADS-B) signal communication systems is that software-defined radios can be used to generate ADS-B signals of spoofed (e.g., non-existent) aircraft, which can cause safety concerns, delays, and confusion for air traffic control and aircraft. Currently, ADS-B broadcasts can be tracked and displayed via internet to show flights in progress broadcasting ADS-B messages. Currently, ADS-B broadcasts may be heard by multiple receivers at receiving base stations. Such ADS-B broadcasts are typically separated by unique Aircraft transponder address fields in the message data; however, while the messages include cyclic coding for parity checks, no encryption or PN (Pseudo-Noise) spreading is applied to the ADS-B broadcasts. Because there is no encryption used for the broadcasts, it is simple to receive/decode and encode/transmit real or fake messages. As a further security risk, the Federal Aviation Administration (FAA) Aircraft Registration Master file is freely available to the public from the FAA website. This database is updated weekly and provides detailed information about aircraft including the unique registration numbers and Mode-S Transponder Codes. This information can be used by casual observers to populate aircraft location maps and track specific aircraft of interest. Unfortunately, this information could also be used by malicious users to transmit fake signals from "ghost planes" using real identifiers.

Therefore, it would be desirable to provide a method, apparatus, and system configured to improve identification of the source of emitted signals.

SUMMARY

Accordingly, an embodiment includes a method for determining whether a signal originated from an aircraft. The method includes receiving a signal. The method also includes measuring a physical layer feature for the signal. The method further includes determining that the signal originated from an emitter of an aircraft based on the measured physical layer feature of the signal.

Additional embodiments are described in the application including the claims. It is to be understood that both the foregoing general description and the following detailed description are exemplary and explanatory only and are not restrictive. Other embodiments of the invention will become apparent.

BRIEF DESCRIPTION OF THE FIGURES

Other embodiments of the invention will become apparent by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications, and equivalents are encompassed. For the purpose of clarity, technical material that is known in the technical fields related to the embodiments has not been described in detail to avoid unnecessarily obscuring the description.

Some embodiments of the invention include a method, apparatus, software or firmware, service, integrated circuit, and/or system configured to determine whether a received signal (such as an automatic dependent surveillance-broadcast (ADS-B) signal) was generated/transmitted by an emitter of an aircraft or was spoofed by a software-defined radio. Additionally, in some embodiments the method, apparatus, software or firmware, service, integrated circuit, and/or system is configured to identify the specific emitter equipment, which transmitted the signal. Further, some embodiments include a method, apparatus, software or firmware, service, integrated circuit, and/or system configured to verify that a received signal was emitted from an aircraft; for example, a method, apparatus, software or firmware, service, integrated circuit, and/or system may be configured to utilize a voice recognition engine to match voice communication radio signals associated with a particular aircraft to ADS-B signals associated with the particular aircraft, thus verifying that the ADS-B signals originated from the particular aircraft.

Some exemplary embodiments are configured to verify that an ADS-B signal is coming from a particular aircraft matched to a unique registration identification and to verify that the ADS-B signal is not a spoofed signal coming from a Software-Defined Radio (SDR) or purchased commercial ADS-B equipment. Some embodiments are configured to examine the validity of the ADS-B signal through performance of at least one method. Firstly, some embodiments are configured to examine the signal for one or more (e.g., one, two, three, etc.) physical layer features. Physical layer features may include transmitter and antenna characteristics, air-to-ground propagation effects, or the like. Exemplary physical layer features include timing of pulses; rise/fall time of pulses; spectral mask; pulse amplitude variation; Doppler shift; carrier leakage; received power; multipath; cyclic spectral content; direction of signal transmission; and antenna polarization. Secondly, some embodiments are configured to examine the signal for one or more (e.g., one, two, three, etc.) data content features. Data content features may include a registration address, plausibility of reported flight path, or the like.

Some embodiments include utilizing Gaussian (i.e., Normal) mixture models (GMM) for grouping feature sets (e.g., physical layer features, data content features, some combination of physical layer features and data content features, or the like) into clusters so that a unique data generator/emitter can be identified. For example, implementations, which utilize Gaussian mixture models (GMM) for grouping feature sets, are configured to identify a manufacturer of a particular emitter, a model of a particular emitter, and uniquely identifiable characteristics of a particular emitter. For example, in some embodiments, one or more physical layer features (e.g., timing of pulses; rise/fall time of pulses; spectral mask; pulse amplitude variation; Doppler shift; carrier leakage; received power; multipath effects; cyclic spectral content; direction of signal transmission; and/or antenna polarization) may be measured at ground stations and fed into clustering algorithms (which, for example, are implemented by utilizing GMMs) to identify, validate, or invalidate the source of the incoming transmission (e.g., an emitter or a software-defined radio).

Some embodiments of the invention are implemented with software and/or equipment suitable for receiving, handling, processing, or transmitting ADS-B signals. Exemplary suitable equipment for transmitting and/or receiving ADS-B signals includes universal access transceivers (UATs), extended Mode-S squitters, or the like. In exemplary implementations, downlink (i.e., air-to-ground) signals may use pulse position modulation (PPM). Some embodiments are configured to estimate and analyze features of signals (such as ADS-B signals) to expose hardware characteristics of an originating emitter, where the hardware characteristics are propagated with the signal from the emitter through a signal-bearing medium (e.g., the atmosphere) to a receiver without being diluted in the presence of noise as the signal passes from air to ground. For example, some exemplary embodiments are configured to estimate and analyze features of signals (such as ADS-B signals) to expose hardware timing characteristics of an originating emitter, where the hardware timing characteristics are propagated with the signal from the emitter through a signal-bearing medium (e.g., air) to a receiver without being diluted in the presence of noise as the signal passes from air to ground. Further, because ADS-B signals are susceptible to multipath interference unless adequate timing synchronization is maintained, some implementations may include signal synchronization, which, for example, may be implemented at a ground station or by using an external timing reference (such as a high precision atomic reference, a rubidium reference, or the like).

Some exemplary embodiments may be additionally configured to perform a method which utilizes cyclic spectrum to detect internal hardware clocking and other periodic fluctuations of receiver equipment, which are not otherwise detectable through traditional Fourier transformations. Such a method may include calibrating the receiver side with respect to spectral content. Such a method includes sweeping over a bandwidth of a receiver component system when no signals are being received; calculating a cyclic spectrum of the receiver component system, the calculated cyclic spectrum corresponding to when no signals are being received; and subtracting the calculated cyclic spectrum from received measurements of the at least one signal. That is, calibrating the receiver side may include measuring and characterizing the receiver itself when no signals are present, calculating cyclic spectral features, and then subtracting this out when measuring received ADS-B signals. This exemplary method prevents the infiltration of false content into signal processing. Such embodiments are configured to compensate for variations in receiver equipment of different manufacturers by removing internal clocking features and periodic features of the receiver equipment before measuring the received signal from an aircraft.

Additional embodiments include, matching ADS-B signals with voice communication channels between aircraft and air traffic control to determine that the particular ADS-B signal is coming from a real aircraft and to verify that the ADS-B signal is not spoofed. Exemplary embodiments of the invention include a method and system for providing a positive identification of an aircraft on an air traffic controller display(s) (or pilot display(s)) while voice communication is taking place in real time. Additionally, some embodiments are configured to improve safety by improving situational awareness for all stakeholders. Also, other embodiments are configured to identify an aircraft based on an aircraft microphone being keyed to an aircraft even when no voice communication occurs.

Some embodiments include a system which couples voice recognition over a noisy communications channel with specific emitter identification technology to positively identify the aircraft. Information generated by the system may be presented to both air traffic controllers and other pilots if a predetermined confidence level (e.g., a 90 percent confidence level, a 95 percent confidence level, a 99 percent confidence level, a 99.9 percent confidence level, or the like) is achieved. Some embodiments include a voice recognition engine configured to classify the speech from the pilot and configured to recognize the call sign being repeated by both the controller and the pilot. While initial communication is taking place (e.g., often on the ground during taxi) between a pilot and air traffic control, the system is configured to collect data based on the RF (radiofrequency) characteristics of one or more signals being transmitted. Because the features (e.g., characteristics) of each electronic emitter differ due to small variations in the front end electronics of the emitter hardware (e.g., in particular, the pulse-shaping RF filter), embodiments are configured to determine whether further communications are associated with a specific aircraft without the call sign being verbally communicated. Embodiments of the invention include storing such information, which may be collected over time, in a data structure (e.g., a database) to provide more accurate aircraft recognition and identification. Additionally, some embodiments may include classifying a spectral signature from specific ADS-B hardware to determine whether the signal is from an aircraft or is spoofed and to identify the emitter (e.g., an emitter of an aircraft or a spoofing device) of the signal; further, this technique may complement multilateration solutions to counter spoofing.

Figure 1:
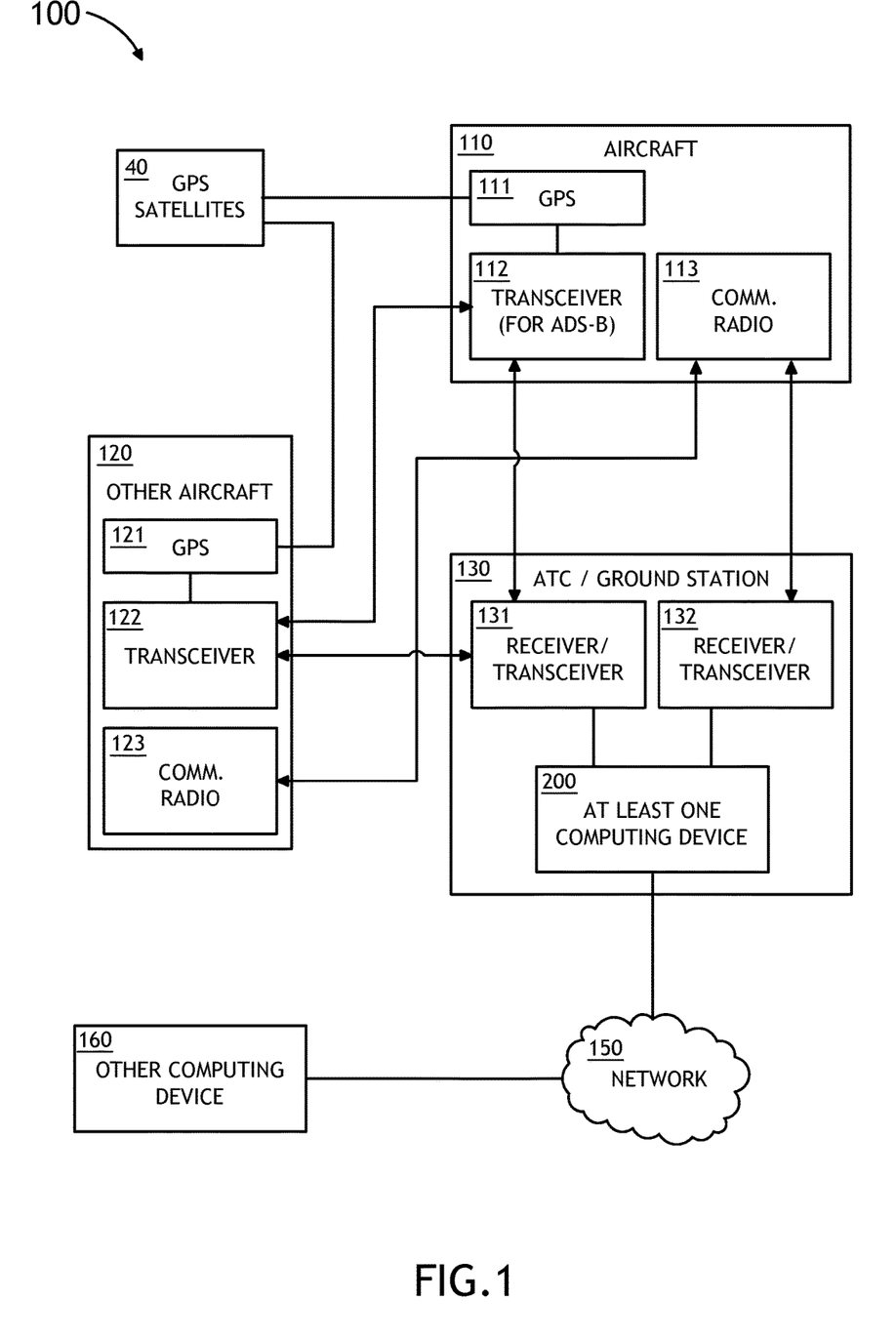
FIG. 1 shows a system topology of embodiments of the invention.

Referring now to FIG. 1, a system 100 of exemplary embodiments is depicted. The exemplary system includes an aircraft 110, an air traffic control station or ground station 130, and global positioning system (GPS) satellites 40. Some embodiments further include at least one other aircraft 120, at least one network 150, and at least one other computing device 160.

In some embodiments, the aircraft 110 includes a global positioning system (GPS) device 111, a transceiver 112, and a communication radio 113, as well as other systems, equipment, and devices commonly included in aircraft. The GPS device 111 receives location data from the GPS satellites 40 and provides the location data to the transceiver 112; for example, the GPS device 111 may receive or calculate location data from a sufficient number (e.g., at least four) of GPS satellites 40 in view of the aircraft 110 such that a GPS solution may be calculated. The transceiver 112 includes a radiofrequency signal emitter and receiver. The transceiver 112 is configured to transmit or broadcast signals to other aircraft (e.g., 120), air traffic control/ground stations 130, or the like. The transceiver 112 may be implemented as a universal access transceiver (UAT) configured to send and receive ADS-B signals. The communication radio 113 is configured to send and receive voice communications to/from other aircraft 120, air traffic control/ground stations 130, or the like.

In some embodiments, the other aircraft 120 includes a global positioning system (GPS) device 121, transceiver 122, and a communication radio 123, as well as other systems, equipment, and devices commonly included in aircraft, as similarly described with reference to the aircraft 110, described above.

In some embodiments, the air traffic control or ground station 130 includes at least two receivers and/or transceivers 131, 132 and at least one (e.g., one, two, three, . . . one-hundred, or more) computing device 200. Each of the receiver/transceiver 131, 132 is configured to receive and/or transmit signals from and/or to aircraft (e.g., aircraft 110, other aircraft 120). For example, receiver/transceiver 131 may be configured to receive ADS-B signals from aircraft 110 and another aircraft 120; likewise, receiver/transceiver 131 may be configured as a transceiver so as to both receive and transmit signals with aircraft. Additionally, for example, receiver/transceiver 132 may be configured to communicate (e.g., transmit and receive signals) with communications radios (e.g., communications radio 113 and/or communications radio 123) of aircraft. Each of the at least one computing device 200 may be configured to process, control, manage, and/or analyze signals received by one or more receivers or to be transmitted by a transmitter. Additionally, one or more of the at least one computing device 200 may be communicatively coupled to an input device (e.g., mouse, keyboard, microphone, or the like), an output device (e.g., a display, speaker, or the like), or an input/output device (e.g., a touch-screen display, or the like) configured to interface with a user. For example, a particular computing device may be configured to output data to an output device for presentation to a user, and the particular computing device may be further coupled to an input device configured to receive input data from a user.

In some embodiments, some or all of a plurality of computing devices (e.g., 200) are communicatively coupled to each other. In further embodiments, one or more of the at least one computing device 200 is communicatively connected to at least one other computing device 160 via one or more networks 150 (e.g., internet, intranet, or the like). For example, the other computing device 160 may comprise a computing device at a different air traffic control station or a different ground station.

Figure 2A:
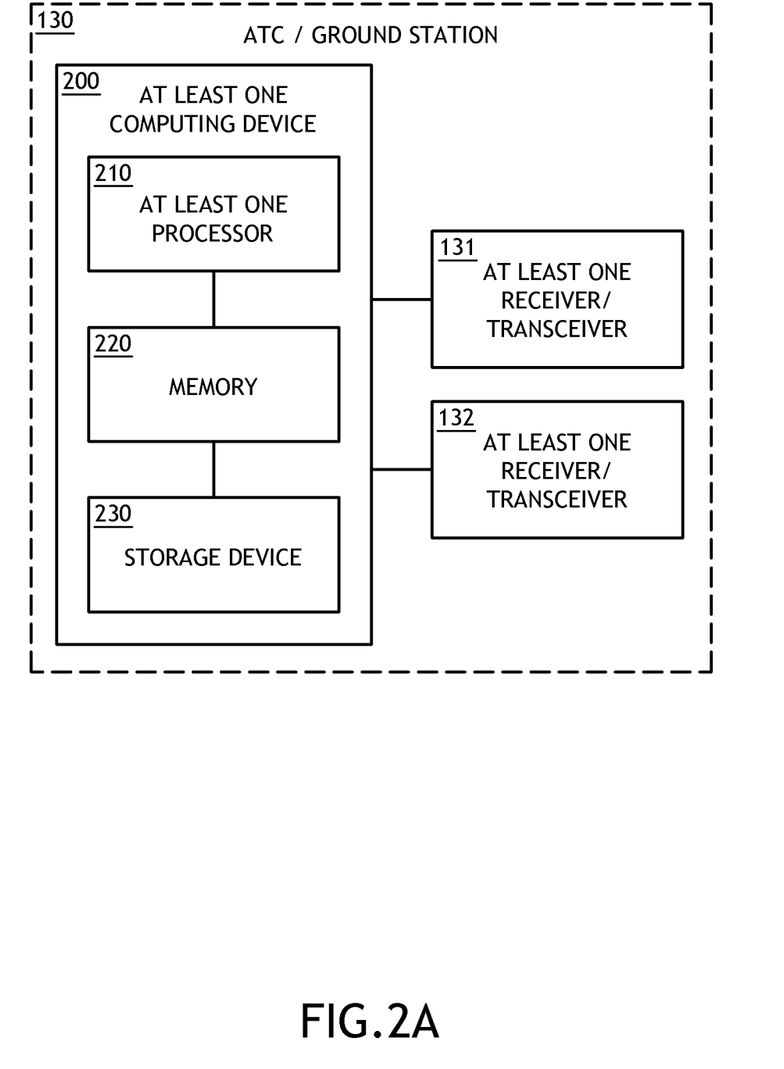
FIG. 2A depicts hardware of a computing device of some embodiments.
Figure 2B:
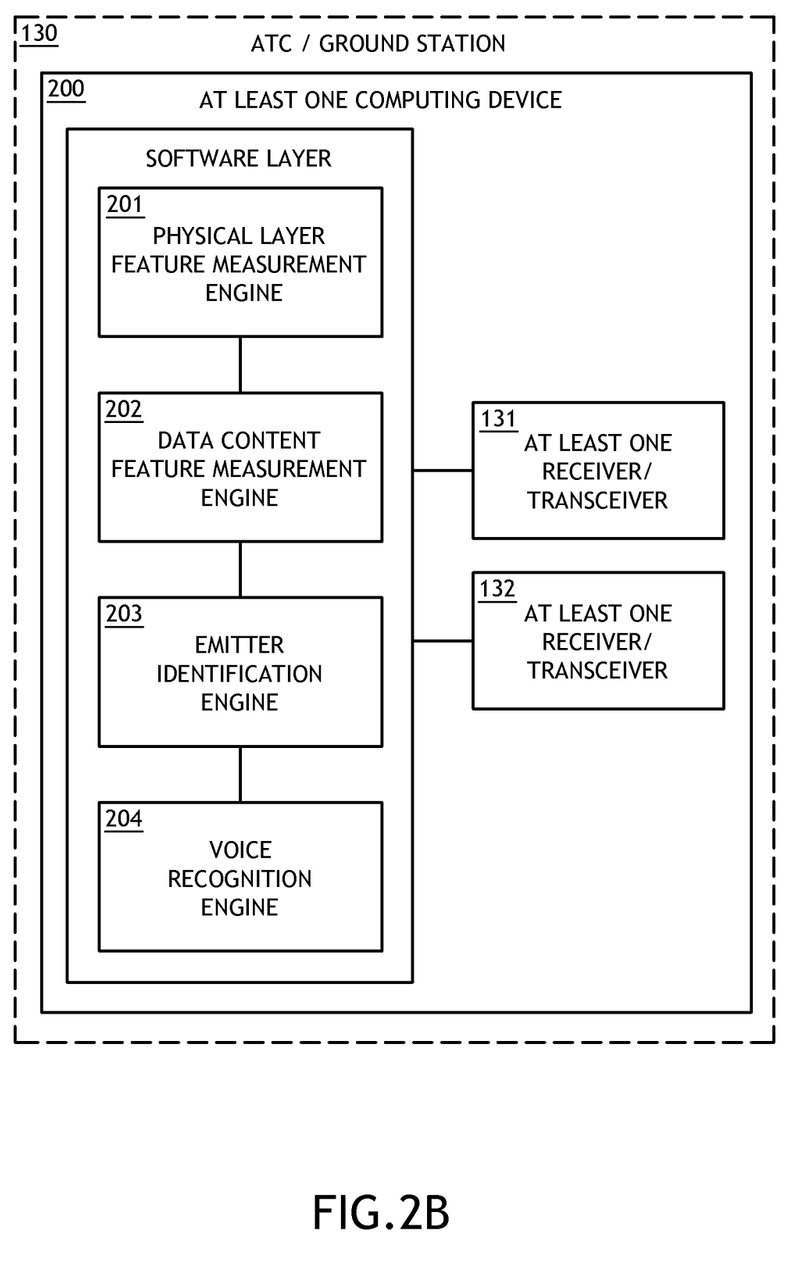
FIG. 2B depicts software of a computing device of some embodiments.

Referring now to FIGS. 2A and 2B, at least one computing device 200 communicatively coupled to a plurality of receiver/transceivers 131, 132 of exemplary embodiments is depicted. In some embodiments, one or more of the at least one computing device 200 may include at least one processor 210, memory 220, and a storage device 230, which are communicatively coupled. It is fully contemplated that each of the at least one computing device 200 may include any of other various computer components, as would be appreciated by one of ordinary skill having the benefit of the instant disclosure. For example, the at least one processor 210 may be configured to process, control, manage, analyze, or perform other operations on signals received from the plurality of receiver/transceivers 131, 132. In some embodiments, the at least one processor 210 is implemented in a distributed computing/multi-processor environment where a particular processor may not be directly communicatively coupled to the receiver but rather the particular processor is coupled to one or more intermediary computing devices or one or more intermediary processors, which is/are in turn coupled to at least one receiver.

As shown in FIG. 2B, the at least one processor 210 of the computing device 200 may be configured to run various software applications or computer code stored in a non-transitory computer-readable medium configured to execute various instructions or operations. For example, the at least one processor 210 may be configured to operate a physical layer feature measurement engine 201, a data content feature measurement engine 202, an emitter identification engine 203, and a voice recognition engine 204.

In exemplary embodiments, the physical layer feature measurement engine 201 may be configured to measure (e.g., recognize, quantitatively measure, quantitatively estimate, or the like) physical features of a signal. RF characteristics of signals transmitted from different individual electronic emitters differ due to the small variations in the analog electronics of each emitter's hardware (for example, particularly due to the analog filtering), and each emitter may emit signals with unique RF characteristics. The unique RF characteristics of each emitter may be stored in a database and used to identify emitters based on the unique RF characteristics of received signals. For example, physical layer feature measurement engine 201 may be configured to measure the following physical layer features of a signal: timing of pulses; rise/fall time of pulses; spectral mask; pulse amplitude variation; Doppler shift; carrier leakage; received power; multipath effects; cyclic spectral content; direction of signal transmission; and antenna polarization. In some embodiments, the physical layer feature measurement engine 201 is configured to estimate physical layer features of the signal.

In exemplary embodiments, the data content feature measurement engine 202 may be configured to measure (e.g., recognize, examine, estimate, or the like) data content features of signals. For example, the data content feature measurement engine 202 may be configured to measure the following data content features of a signal: a registration address, plausibility of reported flight path, or the like.

In exemplary embodiments, the voice recognition engine 204 may be configured to classify the speech from the pilot and configured to recognize the call sign being repeated by both the controller and the pilot.

In exemplary embodiments, the emitter identification engine 203 may be configured to determine whether a signal (e.g., an ADS-B signal) originated from an aircraft or identify the specific emitter of a signal (e.g., an ADS-B signal) based on data received from or produced by any or all of the following: the physical layer feature measurement engine 201, the data content feature measurement engine 202, and the voice recognition engine 204. The emitter identification engine 203 may be configured to recognize individual emitters through externally observable criteria, i.e., parameters and/or characteristics of the transmission. The emitter identification engine 203 is configured to maintain, generate, and access data (which for example may be stored in a database) of individual emitters, as well as the particular units or individuals operating them. The emitter identifier engine 203 may be configured to identify the specific type of emitter that was classified. Additionally, the emitter identifier engine 203 may be configured for various levels of granularity; for example, the emitter identifier engine 203 may be able to distinguish between certain manufacturers and models of emitters (such as UATs) at a particular level of granularity.

In some embodiments, the emitter identifier engine 203 may be configured to identify the signal transmitted by a particular emitter as belonging to specific emitters by utilizing Gaussian (i.e., Normal) Mixture Models (GMMs). For example, by utilizing GMMs, the processor 210 or the emitter identifier engine 203 may accept various physical layer feature estimates and use physical layer feature estimates to discern between and uniquely identify multiple specific RF emitters in a multi-dimensional feature space.

It is fully contemplated that the functionality of the computing device 200 described above may be implemented outside of an air traffic control/ground station 130; for example, the computing device may be implemented within an aircraft (e.g., 110, 120).

Figure 3:
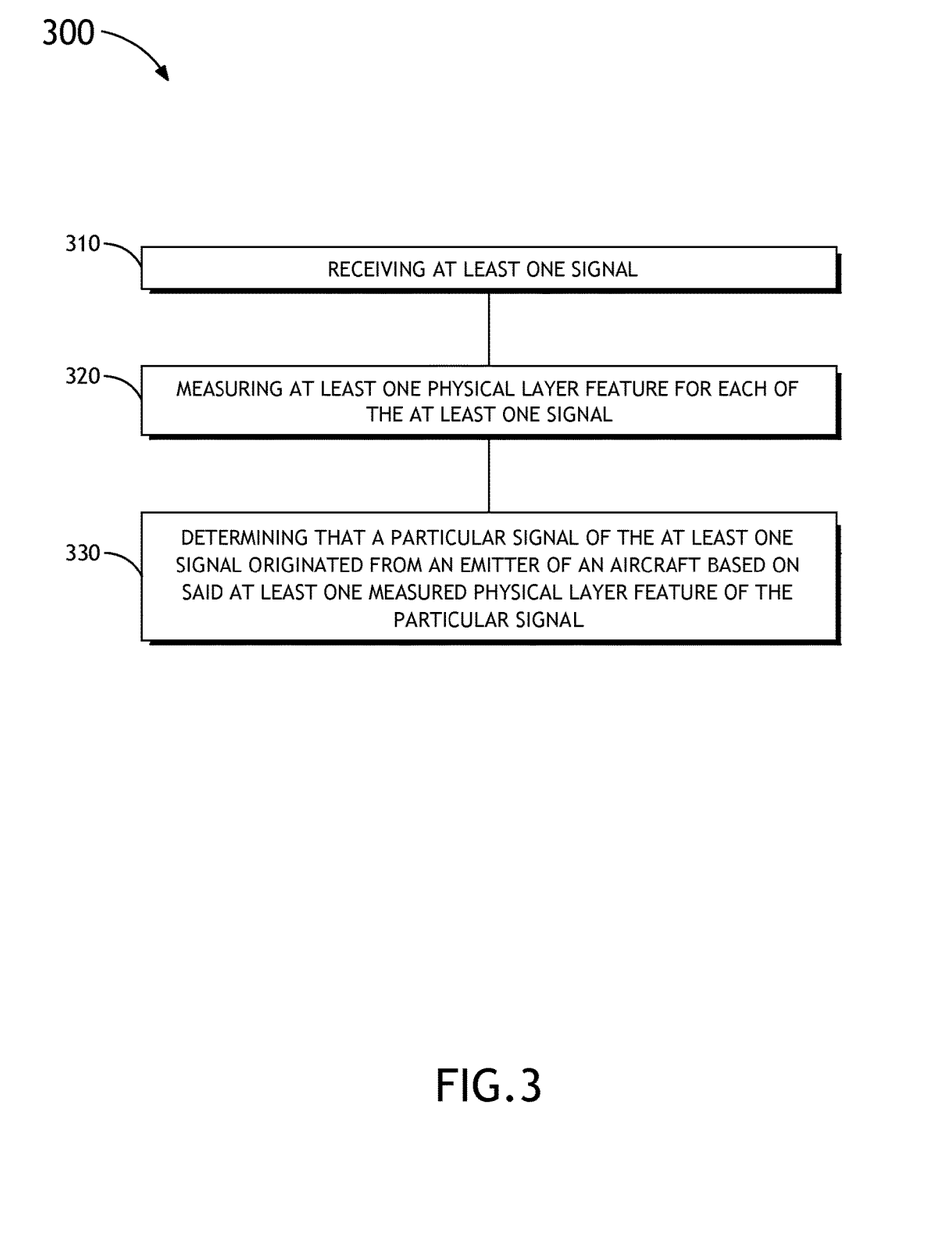
FIG. 3 depicts a method of some embodiments.

Referring now to FIG. 3, an embodiment of the invention includes a method 300. It is contemplated that the steps of embodiments of the method 300 can be performed by at least one computing device 200; one or more of the at least one processor 210 of the computing device 200; one or more engines executed by one or more of the at least one processor 210; at least one component, circuit, or module of a computing device of the system 100; software or firmware executed on a computing device; other computing devices; other computer components; on other software, firmware, or middleware of the system topology 100; or one or more receivers (e.g., 131, 132, 112, 122) of the system 100. The method 300 can include any or all of steps 310, 320, and 330, and it is contemplated that the method 300 can include additional steps as disclosed throughout, but not explicitly set forth in this paragraph. Further, it is fully contemplated that the steps of the method 300 can be performed concurrently or in a non-sequential order. Likewise, it is fully contemplated that the method 300 can be performed prior to, concurrently, subsequent to, or in combination with the performance of one or more steps of one or more other embodied methods disclosed throughout.

Some embodiments of the method 300 include a step 310, wherein the step 310 comprises receiving at least one signal. In some embodiments, the at least one signal may be or may include an ADS-B signal.

Some embodiments of the method 300 also include a step 320, wherein the step 320 comprises measuring at least one physical layer feature of the at least one signal. In some embodiments, the step 320 further comprises measuring at least two physical layer features of the at least one signal. In exemplary embodiments, the at least one physical layer feature is generated based on hardware of the emitter or operation of the aircraft. For example, the at least one physical layer feature may include at least one of: a timing of pulses, rise or fall time of pulses, a spectral mask, a pulse amplitude variation, a Doppler shift, a carrier leakage, a received power, a direction of transmission, a multipath, cyclic spectral content, and an antenna polarization. Various operations of the aircraft may affect the generation of physical layer features; for example, a direction of flight relative to a receiver and/or nearby physical terrain, an orientation of the aircraft relative to the receiver and/or nearby physical terrain, a change in direction of flight relative to the receiver and/or nearby physical terrain, a change in the orientation of the aircraft relative to the receiver and/or nearby physical terrain, or the like may result in quantitatively different measurements of various physical layer features (e.g., Doppler shift, multipath effects, or the like) of the at least one signal.

Some embodiments of the method 300 further include a step 330, wherein the step 330 comprises determining that the at least one signal originated from an emitter of an aircraft based on the at least one measured physical layer feature of the at least one signal. In some embodiments, the step 330 further comprises determining that the at least one signal originated from an emitter of an aircraft based on the at least two measured physical layer features of the at least one signal.

Some embodiments of the method 300 include one or more additional steps. For example, the embodiments of the method 300 may include estimating the at least two physical layer features of the at least one signal. Further, in some embodiments, the method 300 may include performing a clustering algorithm to identify the emitter of the aircraft based on the estimated at least two physical layer features. Additionally, in some embodiments, the method 300 may include performing a probability model analysis to identify the emitter of the aircraft based on the estimated at least two physical layer features.

Additionally, for example, the embodiments of the method 300 may include matching the at least one measured physical layer feature to a unique registration identification associated with the at least one measured physical layer feature.

Further, for example, in some embodiments, the method 300 may include identifying, to within a predetermined confidence level, the emitter of the aircraft based on the at least one measured physical layer feature.

In some embodiments, the method 300 further includes receiving voice communication signals; matching the voice communication signals with the at least one signal; and determining that that the at least one signal originated from an emitter of an aircraft based on the at least one measured physical layer feature of the at least one signal and the voice communication signals upon matching the voice communication signals with the at least one signal.

In some embodiments, the method 300 also includes outputting a verified aircraft identification to an output device for presentation to a user upon determining that the at least one signal originated from the emitter of the aircraft based on the at least one measured physical layer feature of the at least one signal.

In some embodiments, the at least one signal is a first signal, and the method 300 additionally includes receiving at least one second signal; measuring at least one physical layer feature of the at least one second signal; and determining that the at least one second signal originated from a software-defined radio based on the at least one measured physical layer feature of the at least one second signal.

In some embodiments, the method 300 further includes recognizing at least one data content feature for the at least one signal; and determining that the at least one signal originated from an emitter of an aircraft based on said at least one measured physical layer feature of the at least one signal and said at least one recognized data content feature.

In some embodiments, the method 300 also includes a sub-method for calibrating the receiver side with respect to spectral content. For example, the sub-method may include sweeping over a bandwidth of a receiver component system when no signals are being received; calculating a cyclic spectrum of the receiver component system, the calculated cyclic spectrum corresponding to when no signals are being received; and subtracting the calculated cyclic spectrum from received measurements of the at least one signal.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the disclosed subject matter. The accompanying claims may present elements of the various steps in a sample order, and are not necessarily meant to be limited to the specific order or hierarchy presented.

It is believed that embodiments of the present invention and many of its attendant advantages will be understood by the foregoing description, and it will be apparent that various changes can be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method, comprising:
    receiving at least one first automatic dependent surveillance-broadcast (ADS-B) signal;
    estimating at least two physical layer features of the at least one first ADS-B signal;
    recognizing at least two data content features of the at least one first ADS-B signal, wherein the at least two data content features comprises a registration address and a plausibility of a reported flight path;
    determining that the at least one first ADS-B signal originated from an emitter of an aircraft based on the at least two estimated physical layer features of the at least one first ADS-B signal and the at least two recognized data content features of the at least one first ADS-B signal;
    performing a clustering algorithm to identify the emitter of the aircraft based on the at least two estimated physical layer features and the at least two recognized data content features of the at least one first ADS-B signal;
    outputting a verified aircraft identification to an air traffic control station for presentation to a user upon determining that the at least one first ADS-B signal originated from the emitter of the aircraft based on the at least two estimated physical layer features of the at least one first ADS-B signal;
    receiving at least one second ADS-B signal;
    measuring at least one physical layer feature of the at least one second ADS-B signal; and
    determining that the at least one second ADS-B signal originated from an emitter of a spoofed aircraft based on the at least one measured physical layer feature of the at least one second ADS-B signal.

2. The method of claim 1, further comprising:
    performing a probability model analysis to identify the emitter of the aircraft based on the at least two estimated physical layer features.

3. The method of claim 1, further comprising:
    matching the at least two estimated physical layer features of the at least one first ADS-B signal to a unique registration identification associated with the at least two estimated physical layer features of the at least one first ADS-B signal.

4. The method of claim 1, further comprising:
    identifying, to within a predetermined confidence level, the emitter of the aircraft based on the at least two estimated physical layer features of the at least one first ADS-B signal.

5. The method of claim 1, wherein the at least two physical layer features of the at least one first ADS-B signal are generated based on hardware of the emitter or operation of the aircraft.

6. The method of claim 1, wherein the at least two physical layer features of the at least one first ADS-B signal include an antenna polarization.

7. The method of claim 1, further comprising:
    receiving voice communication signals;
    recognizing, by at least one processor executing a voice recognition engine, a spoken flight call sign in the voice communication signals; and
    matching the recognized spoken flight call sign in the voice communication signals with the at least one first ADS-B signal,
    wherein determining that the at least one first ADS-B signal originated from the emitter of the aircraft based on the at least two estimated physical layer features of the at least one first ADS-B signal and the at least two recognized data content features of the at least one first ADS-B signal further comprises:
    determining that that the at least one first ADS-B signal originated from the emitter of the aircraft based on the at least two estimated physical layer features of the at least one first ADS-B signal, and the at least two recognized data content features of the at least one first ADS-B signal, and the recognized spoken flight call sign in the voice communication signals upon matching the recognized spoken flight call sign in the voice communication signals with the at least one first ADS-B signal.

8. The method of claim 1, further comprising:
    receiving at least one third ADS-B signal;
    measuring at least one physical layer feature of the at least one third ADS-B signal; and
    determining that the at least one third ADS-B signal originated from a software-defined radio based on the at least one measured physical layer feature of the at least one third ADS-B signal.

9. The method of claim 1, further comprising:
    sweeping over a bandwidth of a receiver component system when no ADS-B signals are being received;
    calculating a cyclic spectrum of the receiver component system, the calculated cyclic spectrum corresponding to when no ADS-B signals are being received; and
    subtracting the calculated cyclic spectrum from received measurements of the at least one ADS-B signal.

10. A system, comprising:
    at least one receiver configured for receiving at least one first automatic dependent surveillance-broadcast (ADS-B) signal and at least one second ADS-B signal; and
    at least one processor, one or more of the at least one processor being communicatively coupled to the at least one receiver, the at least one processor being configured for:
    estimating at least two physical layer features of the at least one first ADS-B signal;
    recognizing at least two data content features of the at least one first ADS-B signal, wherein the at least two data content features comprises a registration address and a plausibility of a reported flight path;
    determining that the at least one first ADS-B signal originated from an emitter of an aircraft based on the at least two estimated physical layer features of the at least one first ADS-B signal and the at least two recognized data content features of the at least one first ADS-B signal;

performing a clustering algorithm to identify the emitter of the aircraft based on the at least two estimated physical layer features and the at least two recognized data content features of the at least one first ADS-B signal;

outputting a verified aircraft identification to an air traffic control station for presentation to a user upon determining that the at least one first ADS-B signal originated from the emitter of the aircraft;

receiving at least one second ADS-B signal;

measuring at least two physical layer features of the at least one second ADS-B signal; and determining that the at least one second ADS-B signal originated from an emitter of a spoofed aircraft based on the at least one measured physical layer feature of the at least one second ADS-B signal.

11. The system of claim 10, wherein the at least one processor is further configured for:

performing a probability model analysis to identify the emitter of the aircraft based on the at least two estimated physical layer features.

12. A computer program product comprising a non-transitory computer readable medium having program code embodied therewith, the program code executable by at least one processor to perform a method, the method comprising:

estimating at least two physical layer features of at least one first automatic dependent surveillance-broadcast (ADS-B) signal;

recognizing at least two data content features of the at least one first ADS-B signal, wherein the at least two data content features comprises a registration address and a plausibility of a reported flight path;

receiving voice communication signals;

recognizing, by at least one processor executing a voice recognition engine, a spoken flight call sign in the voice communication signals;

matching the recognized spoken flight call sign in the voice communication signals with the at least one first ADS-B signal;

determining that the at least one first ADS-B signal originated from an emitter of an aircraft based on the at least two estimated physical layer features of the at least one first ADS-B signal, the at least two recognized data content features of the at least one first ADS-B signal, and the recognized spoken flight call sign in the voice communication signals upon matching the recognized spoken flight call sign in the voice communication signals with the at least one first ADS-B signal;

performing a clustering algorithm to identify the emitter of the aircraft based on the at least two estimated physical layer features and the at least two recognized data content features of the at least one first ADS-B signal;

outputting a verified aircraft identification to an air traffic control station for presentation to a user upon determining that that the at least one first ADS-B signal originated from the emitter of the aircraft;

receiving at least one second ADS-B signal;

measuring at least one physical layer feature of the at least one second ADS-B signal; and determining that the at least one second ADS-B signal originated from an emitter of a spoofed aircraft based on the at least one measured physical layer feature of the at least one second ADS-B signal.

13. The method of claim 1, wherein the clustering algorithm utilizes a Gaussian mixture model (GMM) for grouping feature sets of the at least two physical layer features and the at least two data content features into clusters.

14. The method of claim 13, wherein performing the clustering algorithm to identify the emitter of the aircraft based on the at least two estimated physical layer features includes identifying a manufacturer and a model of the emitter.

15. The method of claim 1, wherein the at least two physical layer features include at least two of: a timing of pulses, rise or fall time of pulses, a spectral mask, a pulse amplitude variation, a Doppler shift, a carrier leakage, a received power, a multipath, cyclic spectral content, and an antenna polarization.

* * * * *